M. E. PENNINGTON & H. C. PIERCE.
POULTRY COOLING RACK.
APPLICATION FILED JAN. 11, 1912.
1,020,575.
Patented Mar. 19, 1912.
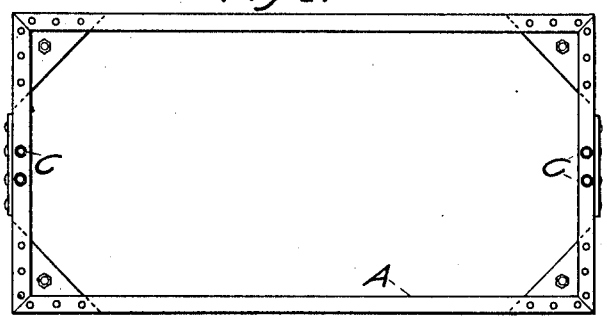
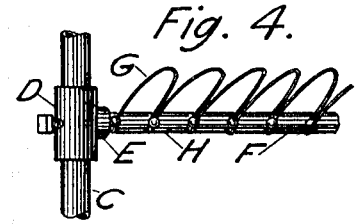
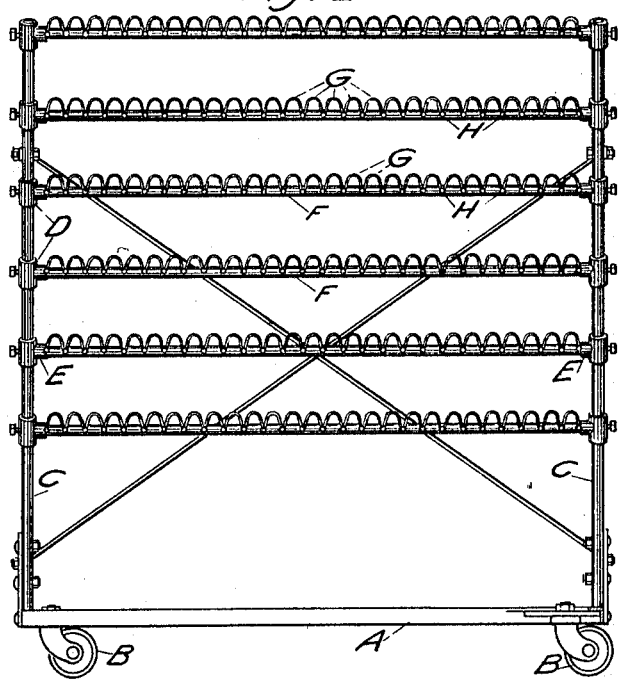
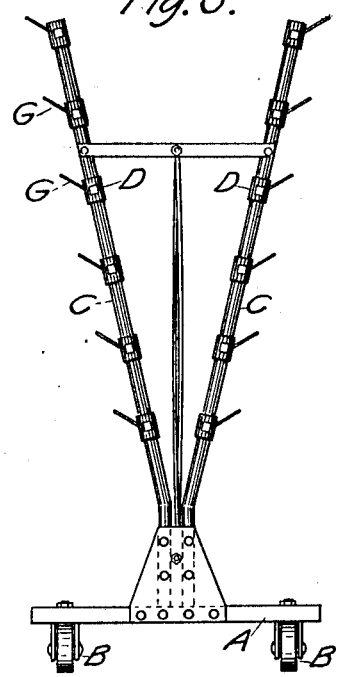
WITNESSES:
Floyd R Harris
Charles W. Boyle
INVENTORS
Mary E. Pennington
Howard C. Pierce
ATTORNEY

UNITED STATES PATENT OFFICE.

MARY E. PENNINGTON, OF PHILADELPHIA, PENNSYLVANIA, AND HOWARD C. PIERCE, OF WORCESTER, MASSACHUSETTS.

POULTRY-COOLING RACK.

1,020,575.  Specification of Letters Patent.  Patented Mar. 19, 1912.

Application filed January 11, 1912. Serial No. 670,724.

(DEDICATED TO THE PUBLIC.)

*To all whom it may concern:*

Be it known that we, MARY E. PENNINGTON and HOWARD C. PIERCE, citizens of the United States of America and employees of the Department of Agriculture, said MARY E. PENNINGTON residing in the city of Philadelphia, State of Pennsylvania, (whose post-office address is Philadelphia, Pennsylvania,) and HOWARD C. PIERCE residing in the city of Worcester, State of Massachusetts, (whose post-office address is 1833 Chestnut street, Philadelphia, Pennsylvania,) have invented a new and useful Improvement in Poultry-Cooling Racks, of which the following is a specification.

This application is made under the act of March 3, 1883, chapter 143 (22 Stat., 625), and the invention herein described and claimed may be used by the Government of the United States, or any of its officers or employees, in the prosecution of work for the United States, or by any person in the United States, without the payment of any royalty thereon.

Our invention relates to racks for cooling poultry after killing.

The object of our invention is to provide a rack which is inexpensive and simple in construction, and one which may be easily handled.

Our invention is particularly designed to quicken the process of cooling poultry after killing; removing any uncleanness incident to such operation; improving the appearance of the birds; and to make the task of sorting poultry less difficult for the grader.

These purposes are attained by the peculiar construction of the rack.

The rack consists of a caster truck forming its base, bearing two upright supports at each end which, in turn, support parallel bars running lengthwise of the base. On these parallel bars are secured wire fingers or hooks adapted to hold the birds by the legs, heads downward. The upright supports are V-shaped, thus being narrow in width at the bottom and separated at a distance at the top. The parallel bars and hooks secured thereto are arranged so as to permit the heads of the birds on the upper rows to clear the bodies of the birds on the lower row, thereby preventing any blood or drip from falling on the birds hanging upon the lower hooks.

By the use of this rack, the cooling process is accelerated because the birds are separated from each other, thus permitting a free circulation of air between the birds. Cleanliness is obtained for the reason that the birds touch no surfaces, thereby lessening the chance of becoming dirtied or infected. The appearance of the cooled birds is improved, due to plumping of the breast and giving them a more symmetrical shape from hanging by their feet. A more complete bleeding is also effected as a result of the birds being suspended by their feet. Furthermore, the work of the grader is rendered less difficult, as the birds being suspended in plain view on a rack, the sorting of the same for size and quality can be readily performed by him.

The nature, characteristic features and scope of our invention may be more readily understood from the following description, taken in connection with the accompanying drawings, forming a part hereof, wherein:

Figure 1 is a plan view of the base of said rack, Fig. 2 is a side view thereof, Fig. 3 is an end view thereof, and Fig. 4 is a detailed view, showing the arrangement of the fingers or hooks.

Referring to the drawings, A represents the base of the rack mounted on wheels or casters, BB, so as to make the device movable.

CC are four V-shaped upright supports having their bottom ends rigidly secured to the base, A. Two of the said upright supports are located at one end of the base, A, and two at the other end. The bottom ends of said upright supports are arranged close together while the top ends are wide apart, as shown in Fig. 3 of the drawings.

Secured to the upright supports, CC, are a series of T-shaped slidable sleeves, DD, suitably spaced, having projections, EE.

FF represent a plurality of bars running parallel with the base, A. These bars, FF, are piped and the projections, EE, are adapted to enter the interior of said bars and fixedly support the same in the manner as shown in Fig. 2 of the drawings. The interior of the upright supports, CC, and parallel bars, FF, are hollow, and said parts are preferably made of galvanized iron. We do not confine ourselves solely to the use of galvanized iron in the construction of such parts, but any other suitable material may be employed for said purpose.

To the plurality of parallel bars, FF, we attach a continuous row of steel wire fingers or hooks, GG. The fingers or hooks extend horizontally from the bars, FF, and are rigidly secured thereto by means of clamps or bolts, HH. Openings are provided in the sides of the said bars, FF, for the reception of the clamps or bolts, HH, for the adjustment of said fingers. These fingers or hooks, GG, are made of strong steel wire and are angular in shape at the ends, as shown in Fig. 4. The space between the fingers at the angular-shaped ends is approximately two inches and at the point where the wire is deflected for the purpose of forming the end of said fingers the space is approximately $\frac{3}{8}$ inch, and it gradually recedes until the space between the hooks at the bars is about one-fourth of an inch. This construction of the fingers permits the legs of the poultry to slide readily between the hooks and to be held in a fixed position by the resiliency of the steel wire hooks, GG.

In practicing our invention we employ a base, A, as shown in Fig. 1. The parts of this base are preferably made of galvanized iron, but any other material sufficiently substantial in quality and durability, capable of supporting the framework of the rack, may be used in the construction of the base. This base, A, is then placed on wheels or casters, BB. To the base, A, we rigidly secure two V-shaped upright supports, CC, at both ends and provide such supports with a series of T-shaped slidable sleeves, DD. These sleeves are secured to the upright supports by bolts. Said sleeves, DD, are provided with projections, EE, for entering the piped bars, FF, and supporting the same parallel with the base, A. After the upright supports and parallel bars have been properly arranged and adjusted, we attach to said bars, FF, a continuous row of spring steel wire fingers or hooks, GG. The bars, FF, are provided with a series of openings for the reception of clamps or bolts, HH, designed for securing the row of fingers or hooks, GG, thereto. When the rack is so constructed it is only necessary for the operator to hang the poultry thereon by passing the legs of the birds between the fingers or hooks, GG. The birds, when suspended from the hooks on the upper rows, clear the bodies of the birds on the lower rows, as the parallel bars, FF, are not superimposed over each other, but each upper bar extends outwardly from the lower bars by reason of the V-shaped upright supports, CC, inclining outwardly, as said supports extend upwardly from the base, A. Such arrangement of the parallel bars, FF, and of the fingers, GG, hold the birds so that they can be readily observed by the grader, and thus render the work of sorting of poultry for size and quality comparatively easy. This means of holding poultry while cooling also quickens the cooling operations, as free circulation of air around the birds is permitted because they are separated from each other. It also prevents the birds from becoming dirtied or infected, as they do not touch any surface while suspended from the hooks. A more complete bleeding of the poultry is also obtained by reason of the suspension of the birds by their feet, and the suspension of the birds in this manner also improves the appearance of the poultry, as such suspension produces plumping of the breasts and causes the shape of the birds to become symmetrical. The use of our rack for holding poultry while cooling is of further advantage to handlers of poultry in that the same can be loaded in the killing room and moved without delay to the cooling room, thus saving much time and labor over present methods employed for the killing and cooling of poultry.

Having thus described our invention we claim as follows:

A movable poultry rack, consisting of a base mounted on wheels, V-shaped upright supports rigidly secured to said base, a plurality of parallel piped bars provided with openings in the sides thereof, a series of T-shaped slidable sleeves adjustably arranged on said V-shaped supports and provided with projections, said projections adapted to enter and support said parallel bars, a continuous row of spring steel wire fingers having pointed ends, said fingers extending horizontally from said parallel bars, clamps for entering the openings in said bars and rigidly securing said fingers thereto, substantially as specified.

In testimony whereof we affix our signatures in the presence of the subscribed witnesses.

MARY E. PENNINGTON.
HOWARD C. PIERCE.

Witnesses:
MARY C. HUBBELL,
MARIA S. MOORE,
J. B. McCOLPIN,
C. S. KEY.

Copies of this patent may be obtained for five cents each, by addressing the "Commissioner of Patents, Washington, D. C."